US009393735B2

(12) United States Patent
Pham et al.

(10) Patent No.: US 9,393,735 B2
(45) Date of Patent: Jul. 19, 2016

(54) SOLID STATE DRAWING LAMINATED POLYMER BILLETS

(75) Inventors: Hoang T. Pham, Lake Jackson, TX (US); Mark A. Barger, Midland, MI (US); Kevin L. Nichols, Freeland, MI (US); Brett M. Birchmeier, Midland, MI (US); Andrew T. Graham, Midland, MI (US)

(73) Assignee: Eovations, LLC, Grand Rapids, MI (US)

( * ) Notice: Subject to any disclaimer, the term of this patent is extended or adjusted under 35 U.S.C. 154(b) by 1216 days.

(21) Appl. No.: 13/144,575

(22) PCT Filed: Jan. 4, 2010

(86) PCT No.: PCT/US2010/020026
§ 371 (c)(1),
(2), (4) Date: Dec. 30, 2011

(87) PCT Pub. No.: WO2010/083063
PCT Pub. Date: Jul. 22, 2010

(65) Prior Publication Data

US 2012/0100355 A1 Apr. 26, 2012

Related U.S. Application Data

(60) Provisional application No. 61/144,764, filed on Jan. 15, 2009.

(51) Int. Cl.

| | |
|---|---|
| ***B32B 7/02*** | (2006.01) |
| ***B32B 7/04*** | (2006.01) |
| ***B32B 3/26*** | (2006.01) |
| ***B32B 7/08*** | (2006.01) |
| ***B29C 55/02*** | (2006.01) |
| ***B29C 47/88*** | (2006.01) |
| ***B29C 55/30*** | (2006.01) |
| *B29C 47/00* | (2006.01) |
| *B29C 47/06* | (2006.01) |

(52) U.S. Cl.
CPC ............. *B29C 55/023* (2013.01); *B29C 47/884* (2013.01); *B29C 55/30* (2013.01); *B29C 47/0019* (2013.01); *B29C 47/0047* (2013.01); *B29C 47/065* (2013.01); *Y10T 156/1044* (2015.01); *Y10T 428/24942* (2015.01); *Y10T 428/249953* (2015.04); *Y10T 428/249981* (2015.04)

(58) Field of Classification Search
CPC ........... B32B 7/02; B32B 27/08; B32B 3/26; B32B 7/04; B29C 47/12; B29C 55/00; B29C 55/02
USPC ........................................................ 428/212
See application file for complete search history.

(56) References Cited

U.S. PATENT DOCUMENTS

| | | | | |
|---|---|---|---|---|
| 4,921,646 | A * | 5/1990 | Stewart | 264/475 |
| 5,888,640 | A * | 3/1999 | Marotta et al. | 428/308.4 |
| 2003/0077471 | A1 | 4/2003 | Tucker | |
| 2003/0082392 | A1 * | 5/2003 | Bader | 428/515 |
| 2005/0171246 | A1 * | 8/2005 | Maine et al. | 524/13 |
| 2005/0192382 | A1 | 9/2005 | Maine et al. | |
| 2008/0111277 | A1 * | 5/2008 | Nichols et al. | 264/292 |

FOREIGN PATENT DOCUMENTS

| | | | |
|---|---|---|---|
| EP | 1859916 | A1 | 11/2007 |
| JP | 33180340 | A | 8/1991 |
| JP | 2000094509 | A | 4/2000 |
| WO | 03035394 | A1 | 5/2003 |
| WO | WO 2010/083063 | A2 | 1/2010 |

OTHER PUBLICATIONS

W. R. Newsom and F.R. Maine, Oriented Polyropylene Compositions Made with Mica, handout from 8th International Conference on Woodfiber-Composites, Madison, Wisconsin, May 23-25, 2005.*

W. R. Newsom and F.R. Maine, Plastic Reactive Fillers/Thermoplastic Composites, handout from 8th International Conference on Woodfiber-Composites, Madison, Wisconsin, May 23-25, 2005.*

W. R. Newsom and F.R. Maine, Oriented Polypropylene Composites Made with Calcium Carbonates, handout from 8th International Conference on Woodfiber-Composites, Madison, Wisconsin, May 23-25, 2005.*

A. Ajji et al, Solid Phase Processing of Polymers, p. 359, Hanser Publishers, Munich.

James L. Throne, Thermo Forming, p. 65-96, Hanser Publishers, Munich.

* cited by examiner

*Primary Examiner* — Aaron Austin
*Assistant Examiner* — Michael Zhang
(74) *Attorney, Agent, or Firm* — McGarry Bair PC

(57) ABSTRACT

Solid state draw a laminated polymer billet containing two or more polymer compositions laminated to one another to prepare an oriented polymer composition.

12 Claims, No Drawings

SOLID STATE DRAWING LAMINATED POLYMER BILLETS

CROSS REFERENCE STATEMENT

This application is a National Phase application of International Application No. PCT/US2010/020026, filed Jan. 4, 2010, which claims the benefit of U.S. Provisional Application No. 61/144,764, filed Jan. 15, 2009, both of which are incorporated herein by reference in their entirety.

BACKGROUND OF THE INVENTION

1. Field of the Invention

The present invention relates to a solid state drawing process for polymer billets and oriented polymer compositions resulting from the drawing process.

2. Description of Related Art

Cross sectional dimensions of a polymer composition necessarily reduce upon drawing the polymer composition. That means that the final drawn article will have smaller cross sectional dimensions than the polymer composition prior to drawing. In drawing films or small dimension articles such a reduction in cross sectional dimensions is not particularly problematic. However, when trying to draw a polymer composition into a final drawn article having large cross sectional dimensions the process can become cumbersome because it requires billets having very large dimensions prior to drawing. The problem is particularly evident when trying to combine into a continuous process both extrusion of an initial polymer billet and drawing the polymer billet. Consider, for example, a solid state drawing process for preparing articles in the form of oriented polymer compositions (OPCs).

A solid state drawing process typically requires extruding a polymer billet, conditioning that polymer billet to a drawing temperature and then drawing the polymer billet to obtain an OPC. Generally, a billet is at a higher temperature upon extrusion than the target drawing temperature for the billet, so thermally conditioning the billet is necessary. Conditioning the billet to a uniform drawing temperature is necessary to achieve uniform orientation throughout the resulting OPC after drawing. However, rapidly cooling an extruded billet to a uniform temperature becomes increasingly challenging as the cross section of the billet increases. The core temperature of a billet is dependent on the difference in temperature between the core and the surface, the distance from the surface to the core, the heat transfer coefficient of the billet material and the heat transfer coefficient at the surface where heat is being removed from the billet. The greater the distance from the surface to the core the more time is necessary to reach a uniform temperature across a billet cross section (equilibrium temperature). For example, the cooling rate of a solid having an infinite width (that is, no edge effects considered) is proportional to the square of the distance form the surface to the core (see, for example, J. L. Throne, THERMOFORMING, Chapt. 3, pp 65, Hanser Publisher, Numich, 1987). Nonetheless, rapid cooling of a billet to a uniform cross sectional temperature equal to a drawing temperature is necessary if extrusion and drawing are to occur together in a continuous process at a reasonable production rate and with a reasonable equipment footprint.

Methods of actively cooling a billet upon extrusion are known. For instance, an early reference describing an OPC drawing process describes exposing a polymer billet to a chilled water bath immediately upon drawing (see, Ward, et al., SOLID PHASE PROCESSING OF POLYMERS, Hanser publishing, Munich (2000), Chapter 9 page 359). Other references merely describe "adjusting the temperature" of a billet to a drawing temperature, a process that typically requires heating a billet to a drawing temperature (see, for example, United States patent application 2005/0192382). Modifying the temperature of a billet's surface can occur relatively rapidly, but creates a thermal gradient between the billet's surface and the billet's core. As a result, adjusting the temperature (or "conditioning") a billet to a drawing temperature often requires super cooling the billet surface until the core reaches a temperature close to the drawing temperature and then reheating the billet exterior to bring the surface portion back up to the drawing temperature. Cooling the core of a billet takes more time as the billet cross section increases. Therefore, conditioning a billet to a drawing temperature can be time consuming for large cross section billets.

In a continuous process, an extruded billet must undergo temperature conditioning to its drawing temperature as it travels from an extruder to a drawing device. As the time for temperature conditioning increases with large cross section billets, the distance between the extruder and drawing device must also increase or the production rate must slow down. Therefore, continuous processes for preparing and drawing large cross section billets can require extremely long process lines or extremely low production rates. It is desirable to more efficiently condition an extruded billet to a drawing temperature in a manner that can be part of a continuous process of preparing a billet and then drawing the billet to prepare an OPC.

BRIEF SUMMARY OF THE INVENTION

The present invention advances the art of producing OPCs by offering an efficient process for producing OPCs that reduces the time necessary for conditioning the temperature of a billet from it extrusion temperature to a drawing temperature.

In a first aspect, the present invention is a process for solid die drawing a large dimensioned oriented polymer comprising the following steps in order, optionally with other steps existing between any two steps: (a) extruding from an extruder a first orientable polymer composition having a surface and core where the first orientable polymer composition, including its surface and core, is at an extrusion temperature; (b) cooling the first orientable polymer composition so that its surface is at a temperature below the extrusion temperature; (c) providing a second polymer composition and laminating the second polymer composition to a surface of the first orientable polymer composition to form a laminated billet; (d) conditioning the laminated billet to a drawing temperature that is lower than the extrusion temperature if the laminated billet is not already at the drawing temperature; and (e) drawing the laminated billet through a solid state drawing die to form an oriented polymer composition having all cross sectional dimensions greater than 1.5 mm. Optional additional polymer compositions that may be orientable can be incorporated into the laminated billet by repeated step (c) to add a third or fourth or any number of polymer compositions prior to step (d).

Embodiments of the first aspect can comprise any one or combination of more than one of the following characteristics: the first orientable polymer composition extends continuously from the extruder until after step (e); the second polymer composition is an orientable polymer composition; the first orientable polymer composition comprises a continuous orientable polymer phase comprising one or more than one of polypropylene, polyethylene, polyester and polyvinyl chloride; the second polymer composition has a composition that is the same as the first orientable polymer composition; both the first orientable polymer composition and the second polymer composition are extruded at an extrusion temperature from the same extruder and through a single extrusion die but through different orifices in the extrusion die and wherein the second polymer composition also undergoes a cooling step to a temperature that is below its extrusion temperature prior to step (c); the second polymer composition comes from a second extruder at a second extrusion temperature and is cooled to a temperature that is below the second extrusion temperature before step (c); the second polymer composition has a composition that is different from the first orientable polymer composition; the second polymer composition is other than an extruded polymer composition; cooling in step (b) includes application of a fluid cooling medium to the first orientable polymer composition; both the first orientable polymer composition and the second polymer composition are conditioned to the drawing temperature prior to adhering them together to form a laminated billet; both the first orientable polymer composition and second polymer composition have a softening temperature and wherein step (c) includes heating the surface of one or both of the polymer compositions to a temperature above its softening temperature and then contacting the surface of the first orientable polymer composition with the second polymer composition in order to achieve a melt-weld between the two polymer compositions and optionally applying pressure so as to compress the first orientable polymer composition and the second polymer composition together as they melt-weld; the first orientable polymer composition and the second polymer composition each have a surface and step (c) comprises applying an adhesive to the surface of one or both of the first orientable polymer composition and the second polymer composition and then contacting the surface together so that the adhesive adheres the first orientable polymer composition and second polymer composition together; the first orientable polymer composition, the second polymer composition or both are laminated billets; step (e) includes drawing the laminated billet through a solid state drawing die; step (e) induces both orientation and cavitation in at least the first orientable polymer composition; and either or both of the first orientable polymer composition and the second polymer composition comprise inorganic filler dispersed within them.

In a second aspect, the present invention is a solid state die drawn oriented polymer composition comprising at least two laminated polymer compositions where at least one of the two laminated polymer compositions is oriented, and wherein the at least two laminated polymer compositions are melt-welded together as evidenced by a melt-weld line at the interface of the at least two laminated polymer compositions.

Embodiments of the second aspect can comprise any one or any combination of more than one of the following characteristics: at least one oriented polymer composition is cavitated; both laminated polymer compositions are of the same composition and are both oriented; the laminated polymer compositions are melt-welded together as evidenced by a melt-weld line at their interface; and the two laminated polymer compositions differ in at least one characteristic selected from a group consisting of extent of orientation, composition, color and extent of cavitation.

A solid state die drawn large dimensioned oriented polymer composition comprising at least two laminated polymer compositions where at least one of the two laminated polymer compositions is oriented, and wherein all cross sectional dimensions of the oriented polymer composition are greater than 1.5 mm.

Surprisingly, the process of the present invention can produce an OPC having an appearance and properties that are similar to that of an OPC prepared from a single extruded billet, yet uses a fraction of the footprint such a process would require.

Moreover, the process of the present invention offers an ability to prepare OPCs having structures uncharacteristic of OPCS from a single extruded billet. For example, the present invention allows for continuous fabrication of OPCs having zones of different materials by, for example, laminating layers of different polymer compositions together to form a billet just prior to drawing the billet into an OPC.

The present invention is useful for preparing OPCs of the present invention. OPCs of the present invention are useful for applications such including rail road ties, large planks, telephone poles, siding, decking materials, fencing materials, decorative trim materials and as a wood replacement in essentially any wood application.

DETAILED DESCRIPTION OF THE INVENTION

Terms

"Polymer composition" comprises a continuous polymer phase containing at least one polymer component and can contain non-polymeric components. A "filled" polymer composition includes discontinuous additives, such as inorganic fillers and/or crosslinked rubber particles, in the polymer composition.

An "orientable polymer" is a polymer that can undergo induced molecular orientation by solid state deformation (for example, solid state drawing). An orientable polymer can be amorphous or semi-crystalline (semi-crystalline polymers have a melt temperature ($T_m$) and include those polymers known as "crystalline"). Desirable orientable polymers include semi-crystalline polymers, even more desirable are linear polymers (polymers in which chain branching occurs in less than 1 of 1,000 polymer units). Semi-crystalline polymers are particularly desirable because they result in greater increase in strength and modulus than amorphous polymer compositions. Semi-crystalline polymer compositions can result in 4-10 times greater increase in strength and flexural modulus upon orientation over amorphous polymer compositions.

An "orientable polymer phase" is a polymer phase that can undergo induced molecular orientation by solid state deformation (for example, solid state drawing). Typically, 75 weight-percent (wt %) or more, even 90 wt % or more or 95 wt % or more of the polymers in the orientable polymer phase are orientable polymers based on total orientable polymer phase weight. All of the polymers in an orientable polymer phase can be orientable polymers. An orientable polymer phase may comprise one or more than one type of polymer and one or more than one type of orientable polymer.

An "orientable polymer composition" is a composition that comprises an orientable polymer in a continuous orientable polymer phase and, optionally, other components such as additives.

"Oriented polymer composition" and "OPC" are interchangeable and refer to an orientable polymer composition having orientable polymers that have been oriented to form an article. To be clear, and OPC is an article rather than a mere polymer composition. An OPC requires processing a polymer composition to orient polymers therein and thereby converts the polymer composition to an article, an OPC.

"Cross sections" of an OPC are perpendicular to the orientation direction of the OPC unless the reference to the cross section indicates otherwise. A cross section has a centroid, a perimeter and dimensions that extend through the centroid and connect two points on the perimeter.

Cross sectional dimension extends in a straight line in a cross section of an OPC connecting two points on a surface of the OPC and extending through the centroid of the cross section in which it resides.

The surface of a polymer composition includes an exposed portion extending two or more dimensions of the polymer composition. The surface extends radially from the exposed portion towards the centroid to a depth of 0.5 centimeters or one third of the distance to the centroid, whichever is less.

The core of a polymer composition comprise the centroid of any cross section of the polymer composition and extends radially out from the centroid towards a surface of the polymer composition to a distance of centimeter or one third the distance to the surface, whichever is less.

In regards to reference to a polymer composition temperature, an artisan understands that a polymer composition typically has a variation in temperature through a cross section (that is, along a cross sectional dimension of the composition) during processing. Therefore, reference to temperature of a polymer composition refers to an average of the highest and lowest temperature along a cross sectional dimension of the polymer composition. The temperature at two different points along the polymer cross sectional dimension desirably differs by 10% or less, preferably 5% or less, more preferably 1% or less, most preferably by 0% from the average temperature of the highest and lowest temperature along the cross sectional dimension. Measure the temperature in degrees Celsius (° C.) along a cross sectional dimension by inserting thermocouples to different points in the cross sectional dimension.

"Solid state" refers to a polymer (or polymer composition) that is at a temperature below the softening temperature of the polymer (or polymer composition). Hence, "solid state drawing" refers to drawing a polymer or polymer composition that is at a temperature below the softening temperature of the polymer (or polymer composition).

"Softening temperature" ($T_s$) for a polymer or polymer composition having as polymer components only one or more than one semi-crystalline polymer is the melting temperature for the polymer composition.

"Melting temperature" ($T_m$) for a semi-crystalline polymer is the temperature half-way through a crystalline-to-melt phase change as determined by differential scanning calorimetry (DSC) upon heating a crystallized polymer at a specific heating rate. Determine $T_m$ for a semi-crystalline polymer according to the DSC procedure in ASTM method E794-06. Determine $T_m$ for a combination of polymers and for a filled polymer composition also by DSC under the same test conditions in ASTM method E794-06. Determine $T_m$ using a heating rate of 10 degrees Celsius (° C.) per minute. If the combination of polymers or filled polymer composition only contains miscible polymers and only one crystalline-to-melt phase change is evident in its DSC curve, then $T_m$ for the polymer combination or filled polymer composition is the temperature half-way through the phase change. If multiple crystalline-to-melt phase changes are evident in a DSC curve due to the presence of immiscible polymers, then $T_m$ for the polymer combination or filled polymer composition is the $T_m$ of the continuous phase polymer. If more than one polymer is continuous and they are not miscible, then the $T_m$ for the polymer combination or filled polymer composition is the lowest $T_m$ of the continuous phase polymers.

$T_s$ for a polymer or polymer composition having as polymer components only one or more than one amorphous polymer is the glass transition temperature for the polymer composition.

"Glass transition temperature" ($T_g$) for a polymer or polymer composition is as determined by DSC according to the procedure in ASTM method E1356-03. Determine $T_g$ for a combination of polymer and for a filled polymer composition also by DSC under the same test conditions in ASTM method E1356-03. If the combination of polymer or filled polymer composition only contains miscible polymers and only one glass transition phase change is evident in the DSC curve, then $T_g$ of the polymer combination or filled polymer composition is the temperature half-way through the phase change. If multiple glass transition phase changes are evident in a DSC curve due to the presence of immiscible amorphous polymers, then $T_g$ for the polymer combination or filled polymer composition is the $T_g$ of the continuous phase polymer. If more than one amorphous polymer is continuous and they are not miscible, then the $T_g$ for the polymer composition or filled polymer composition is the lowest $T_g$ of the continuous phase polymers.

If the polymer composition contains a combination of semi-crystalline and amorphous polymers, the softening temperature of the polymer composition is the softening temperature of the continuous phase polymer or polymer composition. If the semi-crystalline and amorphous polymer phases are co-continuous, then the softening temperature of the combination is the lower softening temperature of the two phases.

"Drawing temperature", ($T_d$), is a temperature within a drawing temperature range at which a polymer is conditioned prior to drawing and is the temperature at which the polymer exists upon the initiation of drawing.

"Weight-percent" and "wt %" are interchangeable and are relative to total polymer weight unless otherwise stated.

"ASTM" refers to an American Society for Testing and Materials test method. The year of the method is either designated by a hyphenated suffix in the method number or, in the absence of such a designation, is the most current year prior to the filing date of this application.

"Multiple" means at least two. "And/or" means "and, or as an alterative." Ranges include endpoints unless otherwise stated.

The process of the present invention is a method of producing an oriented polymer composition (OPC). The process is particularly useful in preparing OPCs of large dimensions including telephone poles, railroad ties and materials of similar or even larger dimensions. Nonetheless, the process is also useful for preparing OPCs of small dimensions more efficiently that prior processes. There is no limitation on what dimension OPC the present process can produce.

The process requires that the following steps occur in a particular order. That means that one of the steps cannot occur before another step in the order. However, additional steps may optionally be included in-between any two steps and the two steps are still considered as occurring in order. That is, requiring that steps occur in order does not require that the steps occur one directly after the other without intervening steps.

The first required step is to extrude from an extruder a first orientable polymer composition having a surface and core where the first orientable polymer composition, including its surface and core is at an extrusion temperature. The extrusion temperature is higher than the softening temperature of the first orientable polymer composition and is the temperature at which the first orientable polymer composition exits the extruder. Generally, there is some type of extrusion die on the end of the extruder through which the first orientable polymer composition is extruded. The first orientable polymer composition is typically at the extrusion temperature upon exiting the extrusion die.

The first orientable polymer composition comprises a continuous orientable polymer phase. The orientable polymers in the orientable polymer phase may be amorphous, semi-crystalline (semi-crystalline polymers are those having a melt temperature ($T_m$)), or a combination of amorphous and semi-crystalline. Desirably the orientable polymer phase comprises one or more than one semi-crystalline polymer and, preferably, the one or more than one semi-crystalline polymer that is continuous throughout the continuous orientable polymer phase.

Suitable orientable polymers include polymers and copolymers based on polypropylene, polyethylene (e.g., high density polyethylene), polymethylpentane, polytetrafluoroethylene, polyamides, polyesters, polycarbonates, polyethylene oxide, polyoxymethylene, polyvinyl chloride, polyvinylidene fluoride polymers having a weight-average molecular weight of from 200,000 to 800,000 g/mol, preferably 250,000 to 400,000 g/mol, liquid crystal polymers and combinations thereof.

Desirable orientable polymers include polymers based on polyethylene, polypropylene, polyester (for example, polyethylene terephthalate) and polyvinyl chloride polymers. A first polymer is "based on" a second polymer if the first polymer comprises monomer repeat units of the second polymer. For example, a block copolymer is based on the polymers comprising the blocks. More particularly desirable orientable polymers include linear polyethylene having a weight-average molecular weight (Mw) from 50,000 to 3,000,000 g/mol; especially from 100,000 to 1,500,000 g/mol, even from 750,000 to 1,500,000 g/mol.

Particularly desirable orientable polymers include polyolefin polymers (polyolefins). Polyolefins tend to be more likely to undergo cavitation, particularly in combination with filler particles presumably because polyolefins are relatively non-polar and as such adhere less readily to filler particles. Linear polymers (that is, polymers in which chain branching occurs in less than 1 of 1,000 polymer units) are even more desirable.

Polypropylene (PP)-based polymers (that is, polymers based on PP) are especially desirable for use in the present invention. PP-based polymers generally have a lower density than other orientable polyolefin polymers. Therefore, PP-based polymers facilitate lighter articles than other orientable polyolefin polymers. PP-based polymers also offer greater thermal stability than other orientable polyolefin polymers. Therefore, PP-based polymers may also form oriented articles having higher thermal stability than oriented articles of other polyolefin polymers.

Suitable PP-based polymers include Zeigler Natta, metallocene and post-metallocene polypropylenes. Suitable PP-based polymers include PP homopolymer; PP random copolymer (with ethylene or other alpha-olefin present from 0.1 to 15 percent by weight of monomers); PP impact copolymers with either PP homopolymer or PP random copolymer matrix of 50 to 97 percent by weight (wt %) based on impact copolymer weight and with ethylene propylene copolymer rubber present at 3 to 50 wt % based on impact copolymer weight prepared in-reactor or an impact modifier or random copolymer rubber prepared by copolymerization of two or more alpha olefins prepared in-reactor; PP impact copolymer with either a PP homopolymer or PP random copolymer matrix for 50 to 97 wt % of the impact copolymer weight and with ethylene-propylene copolymer rubber present at 3 to 50 wt % of the impact copolymer weight added via compounding, or other rubber (impact modifier) prepared by copolymerization of two or more alpha olefins (such as ethylene-octene) by Zeigler-Natta, metallocene, or single-site catalysis, added via compounding such as but not limited to a twin screw extrusion process. Particularly desirable is PP homopolymer or a random copolymer of propylene (PP-based copolymer) with 0.5 to 5 percent by weight ethylene.

Suitable PP-based polymers can be ultra-violet (UV) stabilized, and desirably can also be impact modified. Particularly desirable PP-based polymers are stabilized with organic stabilizers. The UV stabilized PP-based polymers can be free of titanium dioxide pigment thereby allowing use of less pigment to achieve any of a full spectrum of colors.

The first orientable polymer composition can comprise one or more than one additive, or filler, in addition to the orientable polymer. Fillers can be organic, inorganic or a combination of organic and inorganic.

Cellulosic fillers are one type of organic filler. Cellulosic fillers such as wood fiber and powder are known in oriented polymer compositions having large cross sections (that is, cross sectional dimensions all greater than 1.5 mm). However, wood fiber and cellulosic materials in general, are susceptible to color bleaching when exposed to the sun, and to decomposition, mold and mildew, and microbial activity when exposed to humidity even when used as filler within a polymer composition. These features are handicaps that can render cellulosics undesirable for use in filled polymer compositions exposed to sun and humidity.

Inorganic materials do not suffer from the handicaps of cellulosics. Therefore, inorganic filler can be more desirable than cellulosic fillers for use in oriented filled polymer compositions. Inorganic filler may be reactive or inert. Reactive fillers react with water and include materials such as Portland cement and gypsum. Inert fillers do not react with water. Inert inorganic fillers are more desirable for achieving a stable polymer composition density because polymer composition containing the filler density is less likely to change upon exposure to moisture than with reactive filler. Suitable inert inorganic fillers include talc (including any or a combination of material grades commonly known and available as "talc"), fly ash, calcium carbonate, clay (for example, kaolin), dolomite, glass beads, silica, mica, metal, feldspar, carbon black, nano-fillers, Wollastonite, glass fibers, metal fibers, and boron fibers. Particularly desirable inorganic fillers include talc and calcium carbonate.

The optimum amount of filler in the polymer composition of the present process depends on target properties for the final oriented polymer composition. Low levels of filler results in low levels of cavitation (that is, low void volumes due to cavitation). Excessive levels of filler can reduce a polymer composition's strength if the polymer becomes discontinuous in the polymer composition. Typically, the amount of filler is 20 weight-percent (wt %) or more, preferably 30 wt % or more, more preferably 40 wt % or more and most preferably 45 wt % or more. Filler can be present in an amount of 60 wt % or more, even 70 wt % or more. Generally, the amount of filler is 90 wt % or less. If filler is present at a concentration exceeding 90 wt % the polymer composition tends to undesirably lose structural integrity. Determine wt % of filler based on the weight of polymer composition before drawing.

The second step of the present process is cooling the first orientable polymer composition so that its surface is at a temperature below the extrusion temperature. Ideally, the cooling step results in cooling the first orientable polymer composition sufficiently so that its core is within 20° C., preferably within 15° C., more preferably within 10° C. and still more preferably within 5° C. of the drawing temperature. An objective of the cooling step is to bring the first orientable polymer composition close to a desirable drawing temperature before increasing its thickness by lamination. An advantage of the present invention is that multiple orientable polymer compositions can be cooled to a temperature close to a desirable drawing temperature more quickly than a single orientable polymer composition having a thickness equal to a combination of the multiple orientable polymer compositions. Cooling the orientable polymer compositions individually and then laminating them together allows for production of a thick orientable polymer composition near a desirable drawing temperature faster than if the thick orientable polymer composition was extruded and cooled as a single composition. The cooling step can be immediately followed by a heating the surface of the orientable polymer composition to a temperature proximate to (within 20° C., preferably within 15° C., more preferably within 10° C. and still more preferably within 5° C. of) the drawing temperature prior to the third step. The cooling and heating together serves as a temperature conditioning step.

Cool the orientable polymer composition in any of a number of ways, or by a combination of multiple ways. One desirable method of cooling is to spray a cooling fluid over the orientable polymer composition. Another desirable method of cooling is to transfer the orientable polymer composition through a bath of cooling fluid. Suitable cooling fluids include water, water based solutions, oil, and air or other gas.

The third step in the present process is to provide a second polymer composition and adhere the second polymer composition to a surface of the first orientable polymer composition to form a laminated billet. In the present context, "laminated billet" merely refers to a billet comprising two or more compositions adhered together. Desirably, but not necessarily, one polymer composition completely covers a surface of another polymer composition in the laminated billet.

The second polymer composition may be an orientable polymer composition (second orientable polymer composition) or may be other than an orientable polymer composition. If the second polymer composition is a second orientable polymer composition, it is subject to the same composition teachings as the first orientable polymer composition. Nonetheless, the second polymer composition may have the same composition or a composition different from the first orientable polymer composition within the scope of those teachings. In one embodiment, the second polymer composition is a second orientable polymer composition and both the first and second orientable polymer compositions are conditioned to a drawing temperature prior to adhering to one another to form a laminated billet.

The second orientable polymer composition may be identical to the first orientable polymer composition. In fact, both the first and second orientable polymer compositions can come from the same extruder through a die that has two or more orifices wherein the first orientable polymer composition exits the extruder through one orifice and the second orientable polymer composition exits the extruder through another orifice. Both the first and second orientable polymer compositions desirably undergo cooling to a temperature below the extrusion temperature prior to adhering to one another to form the laminated billet.

In an alternative embodiment, the second orientable polymer composition may be an extruded polymer composition that comes from a second extruder at a second extrusion temperature and is cooled to a temperature that is lower than the second extrusion temperature before, even just prior, to adhering to a surface of the first orientable polymer composition. In this embodiment, two orientable polymer compositions may be the same or different in composition even though they are both orientable.

The second polymer composition does not need to be an orientable polymer composition. The second polymer composition can be non-orientable polymer billet (that is, a billet that does not have a continuous phase of orientable polymer) or can be an orientable polymer billet (composition). The second polymer composition can also be a polymer film or even a polymer coating applied in spray or other coating form.

Adhere the second polymer composition to the first orientable polymer composition preferably by melt welding or by using an appropriate adhesive. Melt weld the two compatible polymer compositions together by contacting their surfaces together while the surfaces are at or, desirably, above their softening temperature. It is desirable to have the surface temperatures at least 10° C. above their softening temperature to optimize the strength of the melt weld. Melt welding occurs when polymer chains from one polymer composition entangle with polymer chains form the other polymer composition and vice versa. The polymer compositions must be compatible for melt welding to occur. Two polymer compositions are compatible if their polymer chains will intermingle with one another. The surfaces of the polymer compositions will desirably be at a temperature below the softening temperature so heating of the surfaces is generally necessary. Any method of heating is acceptable including exposing to hot air, radiant heat, or even direct contact with a hot element such as a platen. Contact the surfaces together while they are at a temperature above their softening point and, preferably, apply pressure to compress the surfaces together for a period of time (for example, up to 60 seconds) to achieve a melt weld. One method of applying pressure is to run the two compositions between nip rollers or spaced apart opposing belts.

Use of adhesives is less desirable but a possible method of forming a laminated billet from the first orientable polymer composition and the second polymer composition. A challenge with using adhesives is selecting an adhesive that adheres to both the first orientable polymer composition and the second polymer composition and that maintains adhesion through the drawing of the laminated billet. Selection of an appropriate adhesive will depend on the composition of the two polymer compositions the adhesive will adhesively join. Select an adhesive that adheres to both polymer compositions. Also choose an adhesive that can deform instead of break or fracture during the solid state drawing step. The adhesive is desirably a thermoplastic material, or at least has thermoplastic properties throughout the drawing process. When using an adhesive, apply the adhesive to one or preferably both surfaces being adhered together and then contact the surfaces to one another, preferably while applying pressure. Use of a tie layer may be desirable for billet materials that are adhesively incompatible. For example, a tie layer may adhere to one billet with one adhesive and another billet with a different adhesive thereby adhering the billets to one another.

This third step of providing a second polymer composition and adhering it to a surface of the first polymer composition offers flexibility in the composition of pre-drawn billets that is otherwise unknown. For example, a billet prior to drawing that contains multiple polymer compositions is achievable, as is a drawn OPC comprising multiple polymer compositions in specific locations of the OPC, through the process of the present invention. The laminated billet may comprise multiple polymer compositions adhered in various desirable configurations with the first orientable polymer compositions in order to provide desirable properties at various locations in a cross section of an OPC. Of course, even if the polymer compositions adhered together to form the laminated billet are identical, the present invention still offers the advantage of providing a large dimension pre-drawn billet at a drawing temperature more quickly than is possible by providing a single billet of the same large dimension directly from an extruder. Surprisingly, the resulting laminated billet can be drawn into an OPC without fracturing or failure despite the extreme forces the billet experiences in a drawing process.

The fourth required step is to condition the laminated billet to a drawing temperature that is lower than the extrusion temperature if the laminated billet is not already at the drawing temperature. It is possible that upon forming the laminated billet, the laminated billet is already at a drawing temperature. However, it is also possible that the laminated billet needs conditioning to a drawing temperature. Condition the temperature of the laminated polymer billet as necessary to achieve drawing temperature. Desirably, little if any conditioning is necessary as much of the temperature modification is desirably done prior to forming the laminated billet.

The fifth step in the present process is to draw the laminated billet to form an oriented polymer composition. Drawing a laminated billet requires applying a tensile force to the laminated billet and stretching the laminated billet in the tensile direction. Drawing processes are distinct from orientation processes that only apply pressure to extrude polymer compositions. The tensile force draws a polymer composition, inducing polymer orientation while also facilitating cavitation of the polymer composition during orientation. The present process requires applying a tensile force.

Draw the laminated billet while the billet is in a solid state. Solid state drawing desirably results in alignment, or orientation, of the orientable polymers in the laminated billet. The orientable polymers in the orientable polymer phase of the first orientable polymer composition undergo orientation during the drawing process. If the second polymer composition also comprises orientable polymers, they also desirably undergo orientation during drawing. In a preferred embodiment, cavitation occurs in the laminated billet during the drawing process. Cavitation is an introduction of void volume dispersed within a polymer composition as polymer is drawn away from filler particles, polymer crystallites or other inhomogeneities in the polymer composition. Cavitation can occur in one polymer composition or more than one polymer composition making up the laminated billet. For example, cavitation may only occur in the first orientable polymer composition, only the second polymer composition or in both the first and the second polymer composition during drawing depending on the make-up of the polymer compositions and the drawing conditions (for example, faster drawing rates are more likely to induce cavitation than slower drawing rates).

In a preferred embodiment, draw the laminated polymer composition through a solid state drawing die. Solid state drawing dies have a converging die channel through which a polymer composition is drawn. The shape of the die channel directs the polymer composition to a specific shape during drawing. Solid state drawing dies offer greater control than free drawing processes. Free drawing processes are those that draw a polymer composition apart from application of constraining force on a polymer composition during the drawing process. Typically, some free drawing occurs in die drawing processes after a polymer composition exits the drawing die resulting in a combination of die drawing and free drawing.

The drawing rate is sufficient to induce orientation of the polymer composition and will depend on the polymer composition, drawing temperature and desired properties for the resulting OPC. Desirably, the drawing rate is at least 2.54 centimeters (one inch) per minute and is typically 91 centimeters (36 inches) per minute or faster. Particularly desirable is a drawing rate of at least 127 centimeters (50 inches) per minute since the extent of cavitation has been found to level off at that rate so consistent OPC density is more likely to occur at a drawing rate of 127 centimeters (50 inches) per minute or faster. (See, for example, teaching in United States patent application 2008-0111278, incorporated herein in its entirety). An upper limit for the drawing rate is limited primarily by the drawing force necessary to achieve a specific draw rate. The drawing force should be less than the tensile strength of the polymer composition in order to avoid fracturing the polymer composition. Typically, the drawing rate is 30.5 meters (1200 inches) per minute or less, more typically 9 meters (360 inches) per minute or less.

The process of the present invention prepares an oriented polymer composition comprising at least two laminated polymer compositions wherein at least one, preferably both of the polymer compositions is oriented. The oriented polymer composition is desirably cavitated. The laminated polymer compositions can both be oriented and can be of identical composition, even extruded from the same extruder through a split die. Alternatively, the laminated polymer compositions can differ in at least one characteristic selected from a group consisting of extent of orientation, composition, color and extent of cavitation. When the polymer compositions are melt-welded together during the process there is a melt-weld line at the interface of the laminated polymer compositions. The melt-weld line is apparent under magnification of a cross section of the oriented polymer composition and in some circumstances can be apparent to an unaided eye.

While the present process has been described in the context of laminating two polymer compositions, a first orientable polymer composition and a second polymer composition, it is conceivable and entirely within the scope of the present invention for the processes to include forming a laminate billet having more than two polymer compositions laminated together prior to drawing. For example, the first orientable polymer composition may itself be a laminated billet comprising two or more polymer compositions adhered to one another. Similarly, the second polymer composition may be a laminated billet comprising two or more polymer compositions adhered to one another. Additional steps may exist in the present process that includes adhering one or more than one additional polymer composition to one or more of the first orientable polymer composition and second polymer composition. For example, after the third step of forming a laminated billet from the first orientable polymer composition and the second polymer composition there may exist one or more combinations of steps similar to the second and third steps where a third polymer composition, fourth polymer composition, fifth polymer composition, and so on may be adhered to the laminated billet to form yet another more complex laminated billet prior to drawing. The third, fourth, fifth and so on polymer compositions can be as described for the second polymer billet and may be the same or different from any other polymer composition in the laminated billet.

The present process is desirably a continuous process. That means that the first orientable polymer composition remains as a continuous billet extending from the extruder until after drawing occurs. Such a continuous process becomes particularly challenging to construct as polymer cross sectional dimension become large due to the time needed to condition a polymer billet from its extrusion temperature to the drawing temperature prior to drawing. Extruding a large cross section polymer composition would require a long time to condition the temperature of the composition to a drawing temperature. By laminating multiple polymer compositions together after conditioning their temperature the time needed between extrusion and drawing is dramatically reduced because conditioning occurs with smaller cross section polymer compositions where heat transfer can occur more rapidly than in larger cross section compositions.

The process of the present invention produces an OPC of the present invention that comprises multiple laminated polymer compositions wherein at least one of the polymer compositions is oriented. Desirably, multiple, even all of the polymer compositions comprising the OPC are oriented. OPCs of the present invention generally have a characteristic lamination line where to polymer compositions are adhered together. The lamination line is generally only apparent under magnification (for example, 10× magnification). Desirably, the lamination line is only a fine feature in the OPC that is unapparent to an unaided eye. Surprisingly, even after drawing, the laminated billet remains in-tact and has properties equivalent to an OPC drawn from a single billet having dimensions of the laminated billet.

The process of the present invention is useful for creating a large billet from small dimension billets for the advantage of reducing temperature conditioning time between extrusion and drawing for the large billet. In such a case, the second polymer composition is also a billet. The process offers most advantage in this manner when the large billet has all cross sectional dimensions in excess of 5 centimeters (two inches), even more so when the large billet has all cross sectional dimensions of 10 centimeters or more, and yet more so when the billet has all cross sectional dimensions of 15 centimeters or more.

The process of the present invention is also useful for creating a billet comprising a functional skin prior to drawing by using a functional skin for the second polymer composition. For example, the second polymer composition can be a protective covering such as a scratch and mar resistant layer or film, an ultraviolet resistant (absorbent) layer or film, a colored layer or film or a layer or film offering any combination of these or other functionalities. Creating billets having one or more than one functional skin is desirable in numerous applications. For example, colorant can be concentrated in the functional skin where it will be apparent while the billet below the film can be free of colorant since it is not seen. As another example, rubber particles or other scratch resistant additives can be concentrated in a functional skin on a billet where scratch and mar resistance is needed rather than wasted inside the core of the billet.

Of course, the process can offer both advantages at the same time by laminating multiple polymer compositions together wherein at least two are billets and at least one is a functional skin.

The process of the present invention is also useful for incorporating recycled polymer composition into an OPC. Recycled polymer composition can include any one or combination of more than one of recycled OPC, recycled billets and other recycled polymer material. In many applications the color of an OPC is important, applications such as decking, fencing, siding and any other exposed application. Incorporation of recycled polymer into an OPC is desirable in order to minimize waste. However, it can be difficult to color match recycled polymer compositions with “virgin” (non-recycled) polymer composition, particularly when incorporating recycled polymer compositions having a different color than the virgin polymer composition or the desired color of the resulting OPC. One desirable embodiment of the present invention precludes any need to color match recycled polymer composition with virgin polymer composition and thereby facilitates ready incorporation of recycled polymer composition into any OPC. The desirable embodiment sandwiches a recycled polymer composition with virgin polymer composition in a laminated billet and resulting OPC. Even more desirably, the process encloses recycled polymer composition with virgin polymer composition along all length dimensions of the OPC and, preferably, the laminated billet.

One way to prepare a laminated polymer billet with recycled polymer composition sandwiched between virgin polymer compositions is by preparing a laminated polymer billet having at least three polymer composition layered such that one polymer composition is an interior polymer composition. The interior polymer composition is laminated to both of the other two polymer compositions and resides between the other two polymer compositions.

One way to prepare a laminated polymer billet with virgin polymer composition enclosing recycled polymer composition along all length dimensions is to laminate a recycled polymer composition to and between two virgin polymer compositions that have complementary profiles, meaning that when the virgin polymer compositions are laminated together they cover all length dimension of the recycled polymer composition. The virgin polymer compositions are then desirably laminated to each other as well as the recycled polymer composition.

It is conceived that the virgin polymer compositions achieve their complimentary profile after lamination to the recycled polymer composition by, for example, folding virgin polymer composition that extends beyond a dimension of the recycled polymer composition over the recycled polymer composition so as to enclose the recycled polymer composition along all of its length dimension.

A skilled artisan recognizes that many variations of forming a laminated billet are possible, including many ways to position a recycled polymer composition in the laminated billet such that it has minimal appearance in an OPC resulting from drawing the laminated billet. For example, a recycled polymer composition can be one of more than one polymer compositions sandwiched between virgin polymer compositions in any manner described. Recycled polymer composition can also be visible in a laminated billet if that is desirable.

In a laminated billet, any one or more than one of the polymer compositions can be an oriented polymer composition. In particular, when the laminated billet comprises three or more laminated polymer composition an internal polymer composition can be an orientable polymer composition.

EXAMPLES

The following examples serve to further illustrate embodiments of the present invention.

Comparative Example A

Single Large Dimension Polymer Billet

Prepare an orientable polymer composition by combining 54 wt % polypropylene (INSPIRE® D404 resin, INSPIRE is a trademark of The Dow Chemical Company) and 46 wt % talc (TC-100 From Luzenac) in a 40 millimeter (mm) co-rotating twin screw extruder and then pelletize the polymer composition. Feed polymer and filler at the specified weight ratio through standard loss in weight feeders. Melt the polymer in the mixing extruder and mix the filler into the polymer matrix to form a polymer/filler mix. Feed the polymer/filler mix from the mixing extruder into a suitable pumping device (for example, a single screw extruder or gear pump) and then through a multi-hole strand die to produce multiple strands of the polymer/filler mix. Cool the strands under water and cut them into pellets.

Prepare a billet from the pellets of orientable polymer composition by feeding the pellets to an extruder, plasticating the pellets at a temperature of 198° C. (about 30° C. above the softening temperature of the orientable polymer composition) and extruding the plasticated orientable polymer composition through a rectangular billet die having dimensions of 5.08 centimeters (two inches) wide by 1.52 centimeters (0.6 inches) high. Feed the extruded orientable polymer composition through a calibrator having opening dimensions of 5.08 centimeters (two inches) by 1.52 centimeters (0.6 inches) to a haul off device (for example, belt puller) and haul-off the orientable polymer composition at a rate sufficient to neck the composition to a small enough dimension to fit through a solid state drawing die that will be used to draw down the billet in the next step and long enough extend through the solid state die to a drawing puller. Upon achieving sufficient length of necked down billet, progressively slow the haul-off rate to achieve a gradually larger cross sectional area for the billet until achieving the full 5.08 centimeter by 1.52 centimeter cross sectional dimension. When the billet reaches the full cross sectional dimension it contacts the walls of the calibrator, which smoothes the surface of the billet to a uniform rectangular shape. Cut the billet after achieving a length of billet having full cross sectional dimensions that is approximately four meters (13 feet) long. Repeat the process for each billet used in the Examples and Comparative Examples. The billets have negligible void volume. Therefore, any void volume in resulting OPCs is due to cavitation (that is, OPC void volume is cavitated void volume)

Draw the polymer billets through a solid state drawing die. The solid state drawing die for use in the drawing process is a proportional drawing die, though a proportional drawing die is not necessary for the broadest scope of the process of the present invention. In a proportional drawing die the shaping channel walls define a polymer composition drawing path extending from the entrance opening to the exit opening in which all cross sections of polymer composition have substantially proportional non-circular cross section shape and have a centroid lying on a substantially straight line ("centroid line") extending parallel to the drawing direction. All cross sections of the shaping channel are proportional to one another and the shaping channel walls continually taper towards a centroid line through the shaping channel. The shaping channel wall on the "sides" of the shaping channel (corresponding to the 1.52 centimeter dimension of the initial billet) taper towards a centroid line of the shaping channel at a 15° angle. The shaping channel walls on the "top" and "bottom" of the shaping channel (corresponding to the 5.08 centimeter dimension of the initial billet) taper towards the centroid line of the shaping channel at a 4.6° angle.

Draw each billet through the solid state drawing die to form an OPC. Feed the narrow portion of the billet through the drawing die, through a 23° C. water spray tank that is 1.5 meters (five feet) long and to a billet puller. Condition each billet to a drawing temperature ($T_d$) and set the drawing die to the $T_d$. The $T_d$ is 15° C. below the softening temperature of the polymer composition comprising the billet. Maintain the billet prior to the drawing die and the drawing die at the drawing temperature throughout the drawing process. Draw the billet through the drawing die by gradually increasing the rate (drawing rate) at which the billet puller moves the billet through the drawing die until achieving a drawing rate of 5.8 meters (19 feet) per minute. Increase the drawing rate gradually enough to avoid breaking the OPC exiting the drawing die. During the drawing process, the billet undergoes cavitation as it undergoes orientation.

Example 1

Laminated Billet of Similar Dimension to Comparative Example A Billet

Prepare two initial billets in similar manner as the billet for Comparative Example A except by extruding the polymer composition through a die having a height of 6.35 mm to produce a billet having approximately half the height (thickness) of the billet of Comparative Example A.

Prepare a laminated billet by melt-welding two initial billets together. Align two initial billets that are approximately 20 feet long one over the other on a conveyor system of rollers. Heat the surfaces of the two initial billets that face one another (opposing surfaces) to a melt-welding temperature that is approximately 10° C. above their softening temperature using hot air directed at the surfaces. When the surfaces reach the melt-welding temperature convey the initial billets so that the surfaces at the melt-welding temperature contact one another and compress the initial billets together for approximately 45 seconds by directing them through opposing compressing rollers and then through pulling belts. The result is a laminated billet comprising two initial billets melt-welded together. The resulting laminated billet has dimensions similar to the billet in Comparative Example A.

Draw the laminated billet in like manner as Comparative Example A to produce an OPC of the present invention comprising two laminated polymer compositions. Surprisingly, the laminated billet produces an OPC without failure of the melt-weld. Moreover, the laminated billet produced an OPC having similar strength and properties as single polymer composition billet of Comparative Example A. Table 1 shows density and split strength properties for Comparative Example A (Comp Ex A) and Example 1 (Ex 1). The density of the laminated billets prior to drawing is 1.31 grams per cubic centimeter.

TABLE 1

| Sample | Density (g/cubic centimeter) | Split Strength[a] (Newtons) |
|---|---|---|
| Comp Ex. A | 0.83 | 25 |
| Example 1 | 0.93[b] | 29 |

[a]Measure Split Strength according to the Split Strength Test described below.

[b]Example 1 has a slightly higher density predominately due to lower cavitation as a result of having a smaller nominal draw ratio (NDR) in the drawing process. The laminated billet of Example 1 is slightly less high (thick) than the billet in Comparative Example A. Yet both billets were drawn through the same die. The NDR is the ratio of billet cross sectional dimensions to drawing die exit opening dimensions. A smaller NDR typically results in less cavitation (higher density). Since Example 1 has a smaller billet dimension than Comparative Example A it also would be expected to have a slightly higher density.

Determine Split Strength according the following Split Strength Test. Take a sample of OPC that is 2.54 centimeters wide and 2.54 centimeters long and 1.27 centimeters thick. On one end of the OPC sample introduce a notch extending the width of the OPC and centrally located in the thickness dimension. For Comparative Example A, introduce a notch into one end by slowly hammering a razor blade into the end extending the width of the sample and half-way through the thickness. The notch should run parallel to the length of the sample. Hammer the razor blade in enough to create a 1.27 centimeter (0.5 inch) deep notch. For Example 1, create a notch having the same depth by not heating a segment of the surfaces in the area of the notch and thereby avoiding melt-welding where the notch is. The melt weld should lie in the plane of the notch.

Drill two $1/16^{th}$ inch (1.59 millimeter) diameter holes through the samples and notch that extend from one surface through the opposing surface of the sample and perpendicular through the notch. The holes are centered 13 millimeters apart and 3.2 millimeters from the end of the notched end of the sample. Thread one end of a 24 gauge galvanized steel wire through the hole on one surface and out through the notch and twist to a portion of the wire prior to the hole so as to fasten the wire in a loop through one hole. Repeat with the other end of the wire through the other hole on the same surface of the sample. The sample should have a loop of wire fastened to one half of the sample on the same side of the notch.

With a second wire, repeat this process on the opposing side of the sample so as to create a metal wire loop fastened to the other half of the sample on the opposing side of the notch as the first wire.

Attach the wire loops to opposing grips in an Instron. Pull the wires (and opposing halves of the OPC sample) apart with the Instron at a constant crosshead speed of 50.8 millimeters per minute (two inches per minute) until the OPC sample splits. Record the maximum force prior to splitting as the split strength of the sample. Repeat the test with five samples and take the average of the maximum force prior to splitting of the repetitions to establish a split strength for each of Comparative Example A samples and Example A samples.

The data from Comparative Example A and Example 1 illustrates that the laminated billet produced an OPC having similar strength and density as an OPC drawn from a single non-laminated billet. This result is surprising; particularly in view of the fact that it is surprising the laminated billet merely avoiding failure of the lamination (such as delamination) during drawing.

Comparative Example A and Example 1 illustrate a non-continuous process where billets were extruded in one step and then drawn (Comp Ex A) or laminated and drawn (Ex 1) in a separate step. Identical results are expected from a continuous process for both Comp Ex A and Ex 1 where the billet proceeds directly and continuously from an extruder, through proper temperature conditioning and then either drawing (for Comp Ex A) or laminating to form a laminated billet followed by drawing (for Ex 1). The benefits of the laminated process are most valuable in a continuous process where minimizing the cooling time necessary prior to drawing is valuable to maximize production rate and minimize the equipment footprint (space needed for equipment).

Example 2

Laminated Billet Comprising Recycled Polymer Composition

Prepare a polymer billet of recycled polymer composition in like manner as virgin polymer composition billet by extruding the recycled polymer composition through an extruder and out a die of desirable dimensions. Obtain the recycled polymer composition, for example, by grinding up an OPC and then feeding the ground up OPC into an extruder in like manner as virgin polymer. Adjustments to ground recycled polymer composition particle size and shape can be desirable to optimize properties of the resulting extruded polymer billet.

Prepare a laminated polymer billet and OPC in like manner as Example 1 except substitute the recycled polymer billet for one of the initial billets. Optimally, the recycled polymer billet and initial billet to which is laminated comprise the same or very similar polymers in order to optimize strength in the melt-weld.

Draw the resulting laminated billet through a drawing die in like manner as Example 1 to achieve an OPC of the present invention that comprises a recycled polymer composition.

A variation of Example 2 is to laminate the recycled polymer composition to two initial billets such that the initial billets sandwich the recycled polymer composition to create a three-layer laminated billet and then drawing the three-layer laminated billet to produce an OPC of the present invention with an interior recycled polymer composition.

The invention claimed is:

1. A solid state die drawn large dimensioned oriented polymer composition comprising at least two laminated polymer compositions where at least one of the two laminated polymer compositions is oriented, and wherein all cross sectional dimensions of the oriented polymer composition are greater than 1.5 mm, wherein the oriented polymer composition has a density of 0.93 g/cm$^3$ or less.

2. The oriented polymer composition of claim 1, wherein the at least one of the two laminated compositions that is oriented is cavitated.

3. The oriented polymer composition of claim 1, wherein the at least two laminated polymer compositions differ in at least one characteristic selected from a group consisting of extent of orientation, composition, color, and extent of cavitation.

4. The oriented polymer composition of claim 1, wherein the oriented polymer composition comprises at least three laminated polymer compositions with at least one internal laminated polymer composition adhered to the at least two laminated polymer compositions and wherein at least one of the at least three laminated polymer compositions is oriented.

5. The oriented polymer composition of claim 1, wherein at least one of the at least two laminated polymer compositions comprises a recycled polymer composition.

6. The oriented polymer composition of claim 1, wherein the oriented polymer composition has a split strength of at least 29 Newtons.

7. A solid state die drawn oriented polymer composition comprising at least two laminated polymer compositions where at least one of the two laminated polymer compositions is oriented, and wherein the at least two laminated polymer compositions are melt-welded together as evidenced by a melt-weld line at the interface of the at least two laminated polymer compositions, wherein the oriented polymer composition has a density of 0.93 g/cm$^3$ or less.

8. The oriented polymer composition of claim 7, wherein the at least one of the two laminated compositions that is oriented is cavitated.

9. The oriented polymer composition of claim 7, wherein the at least two laminated polymer compositions differ in at least one characteristic selected from a group consisting of extent of orientation, composition, color, and extent of cavitation.

10. The oriented polymer composition of claim 7, wherein the oriented polymer composition comprises at least three laminated polymer compositions with at least one internal laminated polymer composition adhered to the at least two laminated polymer compositions and wherein at least one of the at least three laminated polymer compositions is oriented.

11. The oriented polymer composition of claim 7, wherein at least one of the at least two laminated polymer compositions comprises a recycled polymer composition.

12. The oriented polymer composition of claim 7, wherein the oriented polymer composition has a split strength of at least 29 Newtons.

* * * * *